Sept. 13, 1960   J. SUCHET   2,952,599
PREPARATION OF METALLIC NITRIDES
Filed July 15, 1958
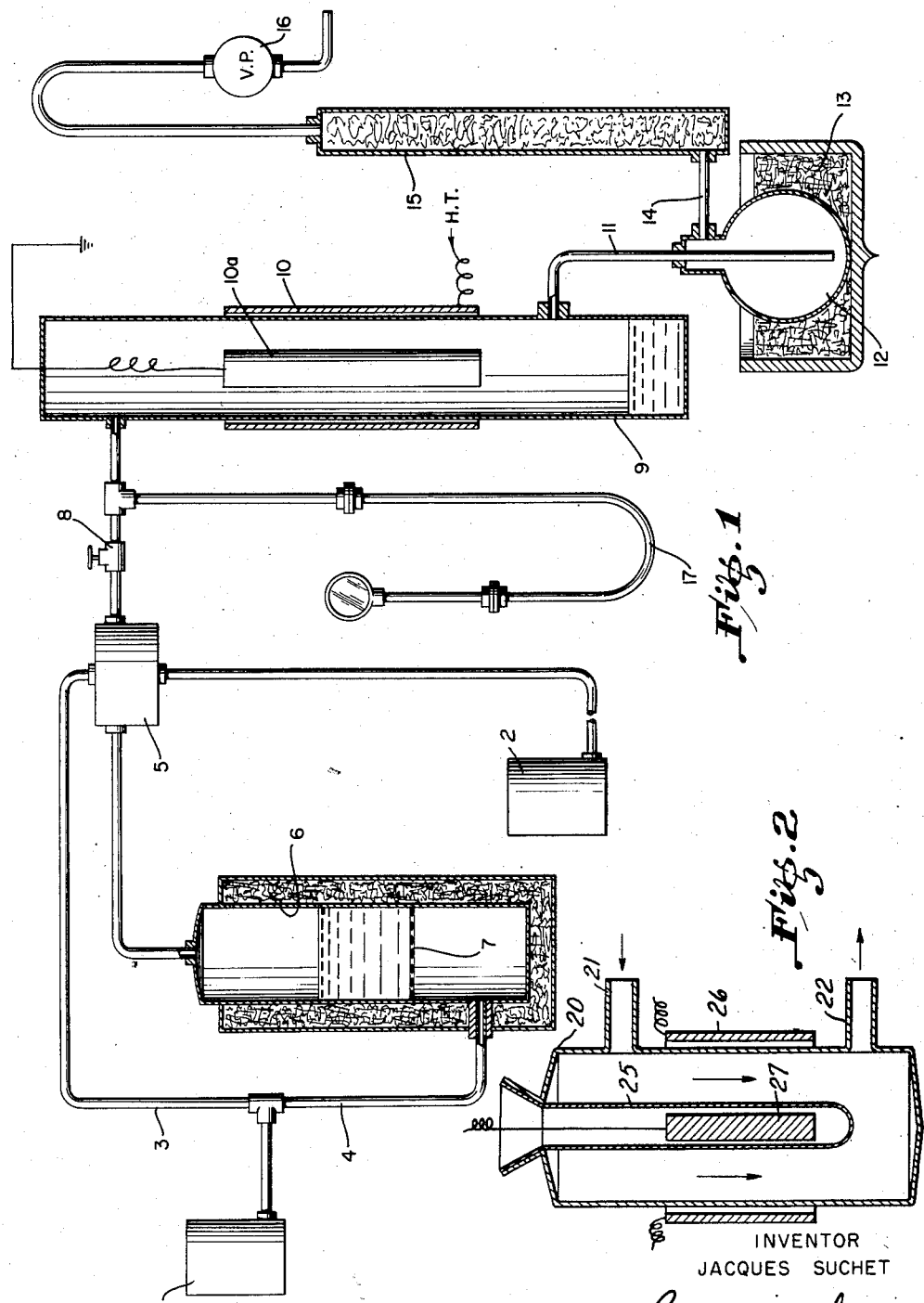
INVENTOR
JACQUES SUCHET
BY Bauer and Seymour
ATTORNEYS

United States Patent Office 2,952,599
Patented Sept. 13, 1960

2,952,599
PREPARATION OF METALLIC NITRIDES

Jacques Suchet, Gif-sur-Yvette, France, assignor to Compagnie de St. Gobain, Paris, France Filed July 15, 1958, Ser. No. 748,677

Claims priority, application France July 17, 1957

8 Claims. (Cl. 204—177)

This invention relates to the synthesis of nitrides of metallic elements of the 4th, 5th and 6th groups of the periodic classification of the elements. By "metallic elements" we means not only true metals, but also metalloids and elements of metallic character, of which silicon is an outstanding example.

It was set forth in copending application Serial No. 686,785, filed September 27, 1957, now abandoned, that if a gaseous compound of a metallic element of the 4th, 5th and 6th groups and a gaseous reducing agent were subjected to a high-frequency electrical discharge in the presence of a reducing agent such as hydrogen, the metallic element itself could be recovered in a state of high purity. The reaction which occurs is one of disintegration and is carried out out of contact with electrodes or other elements that might react with the metallic element. In one form, a continuous induced current having an intensity of 5 kilowatts and a frequency of 1 megacycle per second was used. In another example, an induced current was used having a pulse duration of about 1 microsecond, a frequency of about 500 pulses per second, a mean power of 500 watts, a wavelength of about 10 centimeters, and a carrier wave frequency of about 3,000 megacycles. A useful apparatus was described.

In copending application Serial No. 730,108, filed April 22, 1958, it was discovered that equal or superior results could be obtained by disintegrating vaporized compounds of the metallic elements of the 4th, 5th and 6th groups of the periodic table by subjecting the vapors to condenser discharge. The raw materials included halogenated, hydrogenated and alkylated compounds of metallic elements of the 4th, 5th and 6th groups. That case was also a disintegration, producing metallic elements of high purity. Both cases passed volatile compounds of the metallic element to be prepared, or mixtures of these volatile compounds with a gaseous reducing agent, through a reaction vessel in which the volatile composition was submitted out of contact with electrodes to high-frequency induced electrical discharges, either, in the first case, by means of a solenoid or, in the second case, by condenser discharge.

The applicant has now discovered that the processes described in the foregoing cases can be employed in the synthesis of compounds of high purity. In particular, it has been discovered that nitrides of metallic elements of the 4th, 5th and 6th groups of the periodic table can be prepared in a state of high purity by generating a high-frequency electrical discharge in a gas comprising a vaporized compound of a metallic element of the said groups in admixture with nitrogen and a reducing agent. Thus, according to the invention, one may pass through a reaction chamber a gaseous mixture containing a halogenated metallic element of the 4th, 5th or 6th groups, hydrogen, and nitrogen, the nitride of the metallic element being produced as a result of the induced high-frequency discharge.

In the drawings, Fig. 1 is a schematic representation of an apparatus adapted to the invention. Fig. 2 is a detail of the reaction chamber.

In Fig. 2 of the drawing 20 is the reaction chamber with inlet and outlet ports 21, 22. Outer electrode 26 and inner electrode 27 are shielded from the reaction vapors by glass walls 25, 20.

Example 1

In the drawing, a source of hydrogen 1 and a source of nitrogen 2, highly purified and dried, are connected to a mixer 5. The flow of hydrogen is divided between conduits 3 and 4, of which the latter discharges into the bottom of a receptacle 6 which contains boron chloride. The receptacle 6 contains a perforated plate, for example, of fritted glass, beneath which the pipe 4 discharges and above which the boron chloride is placed. As the hydrogen bubbles through the boron chloride, the latter is vaporized and carried to the mixer 5. The mixed gases pass through a valve 8 to a reaction chamber 9 which is maintained at the pressure desired, in this case reduced by a vacuum pump 16, with a manometer 17. The reaction chamber is supplied with electrodes 10, 10–a forming plates of a condenser, of which 10–a is connected to ground and 10 to a high-voltage generator. The current and power employed may be as described in the identified copending applications and as indicated hereinabove. As the gas from the valve 8 flows through the reaction chamber 9, it is subjected to the high-frequency discharges. Gases issuing from the reaction chamber pass through conduit 11 to trap 12, which is immersed in a mixture of alcohol and carbon dioxide snow which captures the undecomposed boron chloride by condensation, as well as secondary products of reaction such as $BHCl_2$ and $BH_2Cl$. The residual gases issuing from the trap by a conduit 14 pass through a column 15 containing caustic soda, which captures hydrochloric acid resulting from the reaction which forms boron nitride. The main reaction is as follows:

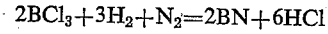
$$2BCl_3 + 3H_2 + N_2 = 2BN + 6HCl$$

The column 15 is connected to the vacuum pump 16 which maintains a pressure of 20 millimeters of mercury throughout the apparatus situated downstream of valve 8.

One sends into the apparatus 120 liters per hour of hydrogen measured at room temperature and pressure, of which 90 liters go directly to mixer 5 and 30 liters go to receptacle 6 containing the boron chloride. 30 liters per hour of nitrogen are sent to the mixer. The receptacle 6 is immersed in melting ice at a temperature of 0° C. The vapor pressure of the boron chloride is about 500 millimeters of mercury. The passage of 30 liters per hour of hydrogen through the boron chloride entrains 60 liters per hour of boron chloride vapor to the mixer 5.

Electrodes 10 and 10–a are supplied with a high-frequency current of 10 kilowatts and a frequency of 1 megacycle per second. After 1½ hours of treatment, there were recovered in the lower part of the reaction chamber 6.5 grams of boron nitride, which corresponds to a yield of about 20% based on the boron chloride decomposed.

Example 2

In the bubbler 6, boron chloride was replaced with silicon tetrachloride. The bubbler was raised to a temperature of 36° C. The hydrogen current of 70 liters per hour was divided, 30 liters per hour going to branch 4, and 40 liters per hour to branch 3. By conduit 2 a nitrogen current of 22 liters per hour was supplied to the mixture. The pressure in the reactor was maintained at about 20 millimeters of mercury. The power and frequency employed were those of Example 1. At the end of 24 hours of operation, there were obtained 350 grams of silicon nitride, which constituted a yield of 25% based on the expenditure of tetrachloride. The reaction is represented by the equation:

$$3SiCl_4 + 6H_2 + 2N_2 = Si_3N_4 + 12HCl$$

*Example 3*

The bubbler 6 received titanium tetrachloride instead of the reactants of Examples 1 and 2, and the temperature of the bubbler was maintained at 90° C. All the hydrogen was sent through the titanium tetrachloride at a rate of 42 liters per hour, the conduit 3 being closed off. 20 liters per hour of nitrogen were supplied to the mixture. The power and frequency of the generator were the same as in Example 1. The pressure was maintained in the reactor at 10 millimeters of mercury. After 12 hours of operation there were obtained 168 grams of titanium nitride which had a formula very close to $Ti_3N_4$ and was a purplish black powder. A yield of 34% was obtained based on a consumption of 1430 grams of tetrachloride. The reaction is represented by the equation:

$$3TiCl_4 + 6H_2 + 2N_2 = Ti_3N_4 + 12HCl$$

The preferred raw materials for this synthesis are the halogenated or hydro-halogenated compounds of the metallic elements of the 4th, 5th or 6th groups. Thus, $SiCl_4$ and $SiHCl_3$ are useful starting materials. The utility of the hydro-halogenated derivatives enables the secondary products, such as $BHCl_2$ and $BH_2Cl$, to be returned to the reactor or forwarded to another reactor for further treatment by induction in the presence of additional quantities of reducing agents and nitrogen.

The advantages of the invention are notably these: that high purity nitrides of metallic elements of the 4th, 5th and 6th groups of the periodic table are prepared in substantial yield using the processes and apparatus of the identified copending applications; a particular advantage of the present invention is that the processes and apparatus of the copending applications have been found useful for synthesis as well as for disintegration.

As many apparently widely different embodiments of the present invention may be made without departing from the spirit and scope thereof, it is to be understood that the invention is not limited to the specific embodiments.

What is claimed is:

1. A method of making boron nitride that comprises passing a mixture of hydrogen, nitrogen, and boron chloride at a pressure of about 20 millimeters of mercury through a reaction chamber, passing a high-frequency condenser discharge having a power of about 10 kilowatts and a frequency minimum of about 1 megacycle per second through the mixture, and isolating boron nitride from the reaction products.

2. A method of making silicon nitride that comprises passing a mixture of hydrogen, nitrogen, and silicon tetrachloride through a reaction chamber at a pressure of about 20 millimeters of mercury, and generating therein a high-frequency discharge having a power of about 10 kilowatts and a frequency minimum of about 1 megacycle per second, and isolating the silicon nitride.

3. A method of making titanium nitride that comprises passing a mixture of hydrogen, nitrogen, and titanium tetrachloride through a reaction chamber at a pressure of about 10 millimeters of mercury, generating a high-frequency discharge in the mixture with a power of about 10 kilowatts and a frequency minimum of about 1 megacycle per second, and isolating the titanium nitride.

4. A method of making nitrides of metallic elements of the 4th, 5th and 6th groups of the periodic classification of the elements that comprises generating a high-frequency electrical discharge having a frequency minimum of about one megacycle in a gaseous halogenated metallic compound of a metallic element belonging to a said group, containing nitrogen, and a gaseous reducing agent, and separating the nitride from the reaction products.

5. A method of making nitrides of metallic elements of the 4th, 5th and 6th groups of the periodic classification of the elements that comprises generating a high-frequency electrical discharge having a frequency minimum of about one megacycle in a gaseous halogenated metallic compound of a metallic element belonging to a said group, nitrogen, and hydrogen, and separating the nitride from the reaction products.

6. The method of claim 4 in which the metallic element is present in a hydro-halogenated form.

7. A process of making high purity nitrides of metallic elements of the 4th, 5th and 6th groups of the periodic classification of the elements that comprises submitting the vapor of a halogenated metal of one of said groups in the presence of nitrogen and a gaseous reducing agent to a high-frequency electrical discharge having a frequency minimum of about one megacycle.

8. The method of claim 5, in which the metallic element is present in a hydro-halogenated form.

References Cited in the file of this patent

UNITED STATES PATENTS

| | | |
|---|---|---|
| 789,440 | Machalske | May 9, 1905 |
| 1,576,275 | Hartmann | Mar. 9, 1926 |
| 2,089,966 | Kassner | Aug. 17, 1937 |
| 2,257,177 | Luster | Sept. 20, 1941 |